United States Patent [11] 3,620,999

| [72] | Inventor | Carl S. Marvel |
| | | Tucson, Ariz. |
| [21] | Appl. No. | 884,013 |
| [22] | Filed | Dec. 10, 1969 |
| [45] | Patented | Nov. 16, 1971 |
| [73] | Assignee | Research Corporation |
| | | New York, N.Y. |

[54] ANTHRAQUINONE-BISBENZAZOLE POLYMERS
3 Claims, No Drawings

[52] U.S. Cl. .................................................. 260/65,
260/30.8, 260/32.6, 260/47, 260/78, 260/79
[51] Int. Cl. ...................................................... C08g 33/02
[50] Field of Search ............................................ 260/47 CZ,
78, 65, 79, 78 TF, 1.5

[56] References Cited
UNITED STATES PATENTS
Re. 26,065  7/1966  Marvel et al. ................. 260/47

| 3,230,196 | 1/1966 | Moyer .......................... | 260/47 |
| 3,313,783 | 4/1967 | Iwakura et al. ............... | 260/78 |
| 3,316,213 | 4/1967 | Berr .............................. | 260/47 |
| 3,424,720 | 1/1969 | Rudner et al. ................ | 260/47 |

*Primary Examiner*—William H. Short
*Assistant Examiner*—L. L. Lee
*Attorney*—Stowell & Stowell ABSTRACT: The condensation of diphenyl 1,5-anthraquinone-dicarboxylate with diaminobenzidine, diaminobiphenol and dimercaptobenzidine yields bisbenzimidazole, bisbenzoxazole and bisbenzothiazole polymers, respectively. These polymers retain the quinone function of the anthraquinone reactant and can be solubilized by reduction to the hydroquinone form. Solutions containing the hydroquinone form can be wetspun into fibers, temperature-stable on oxidation back to the quinone form.

ANTHRAQUINONE-BISBENZAZOLE POLYMERS

This invention relates to anthraquinone-bisbenzazole polymers.

The compositions of the present invention are nitrogen-containing polymers characterized by the presence of a bisbenzimidazole, bisbenzoxazole or bisbenzothiazole moiety and an anthraquinone moiety in the repeating structural unit. These compositions are useful in the preparation of articles capable of withstanding the adverse effects of elevated temperatures.

More specifically, the polymer compositions of the present invention are characterized by the presence of the following recurring structural unit:

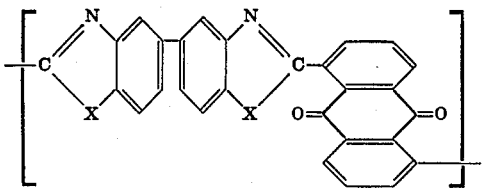

wherein X is NH, O or S.

The polymeric compositions of the present invention are prepared by the condensation of equivalent amounts of diaminobenzidine, diaminobiphenol or dimercaptobenzidine with diphenyl, 1,5-anthraquinonedicarboxylate. While these compositions can be prepared by refluxing the reactants together in a suitable high boiling solvent, polymers of higher molecular weight are obtained by heating the reactants together in the absence of a solvent.

The polymeric compositions of the present invention are insoluble in most solvents and exhibit only limited solubility in solvents such as concentrated sulfuric acid. However, these polymers contain a quinone function and can be solubilized by reduction in alkaline solution to the hydroquinone form. Fibers are formed by wet spinning, e.g., injecting a solution containing the solubilized polymer into an acidic solution, such as an aqueous solution of sulfuric acid. The resultant acid-insolubilized fibers can be air oxidized back to the more stable quinone form.

My invention is further illustrated by means of the following nonlimiting examples:

I. INTERMEDIATES

A. Diphenyl 1,5 Anthraquinonedicarboxylate.

The free acid was prepared according to the method of Scholl et al. Ber., 62, 110 (1929) or Coulson, J. Chem. Soc. 133, 1931 (1930) and converted to the diacid dichloride by reaction with phosphorus pentachloride in phosphorus oxychloride. 10 grams of the diacid dichloride and 15 g. of phenol were reacted together for 2 hours in 300 ml. of refluxing pyridine. The solid which precipitated on cooling was separated by filtration. Recrystallization from dimethylformamide and then from veratrole gave the ester as a yellow-white solid melting 325°–326° C. with decomposition.

B. 3,3'3,3'A

This compound, as its salt, was prepared according to the general procedure described in "Methoden der Organischen Chemi" Houben-Weyl, Vol. IX, p. 39, Verlag Chemi, Weinheim, Germany (1952. Operating in an atmosphere of nitrogen, the free base was obtained by dissolving 4 g. of the dipotassium salt in 60 ml. water and filtering to remove the insoluble material. The filtrate was then poured into a solution containing 2 ml. of glacial acetic acid, and 2 ml. of water, and the solution cooled to 0° C. The resultant white solid was filtered, washed with water and dried.

II. POLYMERIC PRODUCTS

A. Poly([6,6']-2,2'-diyl-1,5-anthraquinonylene)

1. With solvent. Under an atmosphere of nitrogen, 1,495 mg. of diphenyl 1,5-anthraquinonedicarboxylate and 1,071 mg. of 3,3'-dimercaptobenzidine dihydrochloride were dissolved in diethylaniline and the solution warmed to boiling; a red product began to precipitate within a few minutes. The reaction mixture was refluxed for 2 hours, cooled, poured into a large volume of methanol and the resultant solid separated by filtration. The yield of product polymer after drying was 956 mg. Its inherent viscosity was 0.28, measured at 0.2 percent concentration in sulfuric acid at 30.2° C.

2. Without solvent. Operating in an atmosphere of nitrogen, equivalent amounts of diphenyl 1,5-anthraquinonedicarboxylate and 3,3'dimercaptobenzidine were ground together and warmed under nitrogen for 3 hours at 240° C. The reaction system was cooled; vacuum was then applied and mixture brought to 300° C. and kept at that temperature for 12 hours. The reaction mixture, after cooling, was washed with hot dimethylformamide and then with alcohol. The yield of product polymer, after drying, was 97 percent of the theoretical. When subjected to thermogravimetric analysis, the polymer did not begin to lose weight until about 500° C.

B. Poly[5,5'-bibenzimidozole]-(2,2'-diyl-(1,5 -anthraquinonylene)

Equivalent amounts of diphenyl 1,5-anthraquinonedicarboxylate (1,495 mg. and 3,3'-diaminobenzidine (714 mg.) were melted together under nitrogen and kept at 220° C. and kept at that temperature for 14 hours. The reaction mixture was cooled, ground and washed with dimethylformamide followed by methanol. The yield of product polymer, after drying, was 1,410 mg.

Anal. Calcd: C, 76.7 percent; H, 3.21 percent
Found: C, 77.1 percent; H, 3.83 percent The inherent viscosity of the polymer was 0.14 measured at 0.2 percent concentration in sulfuric acid at 30.2 ° C. On thermogravimetric analysis, the polymer gradually started losing weight on heating to above about 350° C.

III. FIBER FORMATION

A solution was prepared under nitrogen containing 100 mg. of sodium dithionite, 100 mg. of potassium hydroxide in 1 ml. of water, 1 ml. of dimethylformamide and, in separate experiments, 100 mg. of the polymers from the previous example. Fibers were formed when the solutions of solubilized polymer in the hydroquinone form were discharged into aqueous sulfuric acid. The fibers had a violet appearance when first prepared but gradually turned brown on standing; heating in air completed oxidation to the more stable quinone form. The fibers, generally in admixture with other fibers, may be woven or knit into heat-resistant fabrics.

Other variations in our invention will suggest themselves to those skilled in the art and my invention is as claimed.

I claim:

1. A fiber forming polymer consisting essentially of the recurring structural unit:

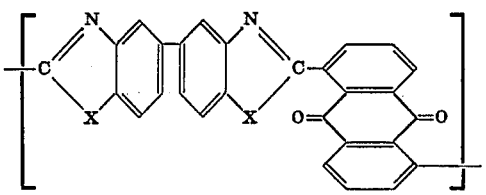

wherein X is NH, O or S.

2. Fiber forming poly ([5,5'-bisbenzimidazole]-2,2'-diyl-1,5-anthraquinonylene).

3. fiber forming Poly([6,6']-2,2'-diyl-1,5-anthraquinonylene).

* * * * *

UNITED STATES PATENT OFFICE
CERTIFICATE OF CORRECTION

Patent No. 3,620,999     Dated November 16, 1971

Inventor(s) CARL S. MARVEL

It is certified that error appears in the above-identified patent and that said Letters Patent are hereby corrected as shown below:

Claim 3 should read:

--3. Fiber forming poly ([6,6'-bibenzothiazole]-2,2'-diyl-1,5-anthraquinonylene).--

Signed and sealed this 9th day of May 1972.

(SEAL)
Attest:

EDWARD M. FLETCHER, JR.
Attesting Officer

ROBERT GOTTSCHALK
Commissioner of Patents